United States Patent

Kuriyama et al.

[11] Patent Number: 5,670,068
[45] Date of Patent: Sep. 23, 1997

[54] APPARATUS FOR LASER PROCESSING AND MONITORING

[75] Inventors: Katsuhiro Kuriyama, Takarazuka; Toshiharu Okada, Ibaraki; Yuji Uesugi, Osaka; Shoro Mochida, Neyagawa; Kazuyoshi Yamaguchi, Moriguchi, all of Japan

[73] Assignee: Matsushita Electric Industrial Co., Ltd., Osaka-fu, Japan

[21] Appl. No.: 427,907

[22] Filed: Apr. 26, 1995

[30] Foreign Application Priority Data

Apr. 26, 1994 [JP] Japan ................................. 6-088365

[51] Int. Cl.$^6$ ................................................ B23K 26/06
[52] U.S. Cl. ................................ 219/121.68; 219/121.83
[58] Field of Search ................ 219/121.68, 121.69, 219/121.73, 121.74, 121.76, 121.77, 121.83; 372/13, 22; 348/359, 370; 250/557

[56] References Cited

U.S. PATENT DOCUMENTS

| 4,011,403 | 3/1977 | Epstein et al. | 348/370 |
|---|---|---|---|
| 4,412,330 | 10/1983 | Mauck et al. | 372/13 |
| 4,617,666 | 10/1986 | Liu | 372/22 |
| 4,728,770 | 3/1988 | Kaprelian | 219/121.83 |
| 4,745,289 | 5/1988 | Mashima | 250/548 |
| 4,789,770 | 12/1988 | Kasner et al. | 219/121.74 |
| 5,017,755 | 5/1991 | Yahagi et al. | 219/121.68 |
| 5,173,584 | 12/1992 | Kahlert et al. | 219/121.83 |
| 5,208,437 | 5/1993 | Miyauchi et al. | 219/121.83 |
| 5,227,607 | 7/1993 | Ishiyama | 219/121.68 |

FOREIGN PATENT DOCUMENTS

| 504850 | 9/1992 | European Pat. Off. | |
|---|---|---|---|
| 4105060 | 8/1992 | Germany | 219/121.83 |
| 55-77989 | 6/1980 | Japan | 219/121.76 |
| 60-162587 | 8/1985 | Japan | 219/121.68 |
| 2-80189 | 3/1990 | Japan | 219/121.73 |
| 3-131005 | 6/1991 | Japan | 219/121.68 |
| 4-339586 | 11/1992 | Japan | 219/121.74 |
| 5-115991 | 5/1993 | Japan | 219/121.74 |

*Primary Examiner*—Geoffrey S. Evans
*Attorney, Agent, or Firm*—Wenderoth, Lind & Ponack

[57] ABSTRACT

A laser processing apparatus includes a laser beam source, a focusing optical system for focusing a laser beam from the source as a processing laser beam to a surface of an article, an illuminating optical system using a laser beam of the same frequency as that of the processing laser beam as an illumination laser beam for illuminating the surface of the article, and a photographing device for detecting the illumination laser beam reflected from the article through the focusing optical system to thereby monitor a position to be processed. Since the laser beam of the illuminating optical system is of the same frequency as that of the processing beam chromatic aberration is prevented. This allows increased monitoring accuracy so that an article such as copper foil can be processed by a laser beam with an accuracy of 10 microns to monitor and correct a processing position.

4 Claims, 7 Drawing Sheets

5,670,068

APPARATUS FOR LASER PROCESSING AND MONITORING

BACKGROUND OF THE INVENTION

The present invention relates to an apparatus and a method for laser processing used in a laser trimming machine when a circuit constitutional material of an electronic component on a circuit board is trimmed by a laser beam to adjust electric characteristics of the electronic component or in a laser marker, etc. to mark an electronic component by means of a laser beam, and more particularly to an apparatus and a method for laser processing of a conductive body such as a copper foil or the like at a correct laser processing position.

A conventional example of the above mentioned laser processing apparatus will be described with reference to FIG. 9.

In FIG. 9, a laser output beam 42 having a frequency of 1064 nm from a YAG laser oscillator 41 is reflected by a reflecting mirror 43 to bend and enter a dichroic mirror 44. The dichroic mirror 44 is adapted to reflect the laser output beam 42 and pass an illuminating beam of a red frequency to be described later. Therefore, the laser output beam 42 entering the dichroic mirror 44 is reflected by the dichroic mirror 44 and brought into an X scanner mirror 47. As the X scanner mirror 47 is rotated back and forth in an X direction by an X galvano scanner 45, the laser output beam 42 entering the X scanner mirror 47 scans in the X direction and is reflected 90° to enter a Y scanner mirror 48. The laser output beam incident upon the Y scanner mirror 48 scans in a Y direction and is reflected 90° because of the reversal of the Y scanner mirror 48 in the Y direction by means of a Y galvano scanner 46. In consequence, the laser output beam 42 enters an fθ lens 49 which has a function to form an image of a beam of two frequencies, i.e., 1064 nm of the laser output beam 42 and the red frequency of the illuminating beam on a plane. The laser output beam 42 is focused to a scanning position on a circuit board 50 where an electronic component 51 to be processed is mounted. In this manner, only a desired position of the electronic component 51 is processed by the laser output beam during scanning of the laser output beam in the X and Y directions under the control of the laser oscillator 41 by an oscillation controlling means (not shown).

In the constitution as above, the X galvano scanner 45, Y galvano scanner 46, X scanner mirror 47, and Y scanner mirror 48 generate heat during the operation, with accompanying errors from a temperature drift which is caused by the heat and results in a change of the scanning position. Moreover, not only is the mounting position of the electronic component 51 on the circuit board 50 irregular, but an error is brought about in a processing position by the laser beam. To avoid these inconveniences, a monitoring camera 52 is provided to monitor the position of the electronic component 51 to be processed, based on which a position correcting means (not shown) corrects the position.

In order to monitor the position, a halogen lamp 54 illuminates the circuit board 50. The beam of the halogen lamp 54 which covers the whole area of visible beams is, when illuminating the circuit board 50, reflected to enter the fθ lens 49. The beam passing the fθ lens 49 passes through the Y scanner mirror 48 and X scanner mirror 47 and, at the dichroic mirror 44, only a red beam of the visible beams is allowed to pass the mirror 44. The red beam of the halogen lamp 54 passing the dichroic mirror 44 forms an image on the monitoring camera 52 by an image forming means 53. The position is thus monitored, so that the processing position is corrected based on the monitored data.

Meanwhile, the red beam passing through the dichroic mirror 44 has a bandwidth of several tens of nm in frequency. Therefore, the image formed by the fθ lens 49 unfavorably blurs in the peripheral part thereof as a result of the chromatic aberration by the bandwidth. A required monitoring accuracy of 10 μm cannot be maintained in the peripheral part of an 80 mm×80 mm image.

If a bandpass filter of a narrow band is used to eliminate the above chromatic aberration, the amount of beam to be received by the monitoring camera 52 becomes short, and hence the halogen lamp 54 is required to have an output of several kW to compensate for the shortage although it is difficult to handle the heat generated by such an intense halogen lamp 54.

The fθ lens 49 is difficult to design so as to eliminate the chromatic aberration, with the number of lenses increased. Also, it is complicated to design an antireflection coating fit for the lens 49 with an increased number of lenses. The fθ lens 49 undesirably becomes expensive.

Furthermore, trimming of the conductive body, e.g., copper foil is a hard task in the prior art.

SUMMARY OF THE INVENTION

The object of the present invention is therefore to provide a laser processing apparatus and a laser processing method whereby a copper foil can be processed by a laser beam with an accuracy of 10 μm to monitor and correct a processing position.

In accomplishing these and other objects, according to one aspect of the present invention, there is provided a laser processing apparatus comprising:

a laser beam source;

a focusing optical system for focusing a laser beam as a processing laser beam to a surface of a to-be-processed article;

an illuminating optical system using a laser beam of the same frequency as that of the processing laser beam as an illumination laser beam for illuminating the surface of the to-be-processed article; and a photographing means for detecting the illumination laser beam reflected from the to-be-processed article through the focusing optical system to thereby monitor a processing position by the laser beam.

According to another aspect of the present invention, there is provided a laser processing method comprising the steps of:

processing an article while a processing laser beam is focused onto the article by a focusing optical system;

illuminating the article by an illumination laser beam of the same frequency as that of the processing laser beam by means of an illuminating optical system;

detecting the illumination laser beam reflected from the article by a photographing means via the focusing optical system to monitor a position to be processed by the processing laser beam; and correcting a relative position of the processing laser beam and the article on the basis of the monitoring result.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
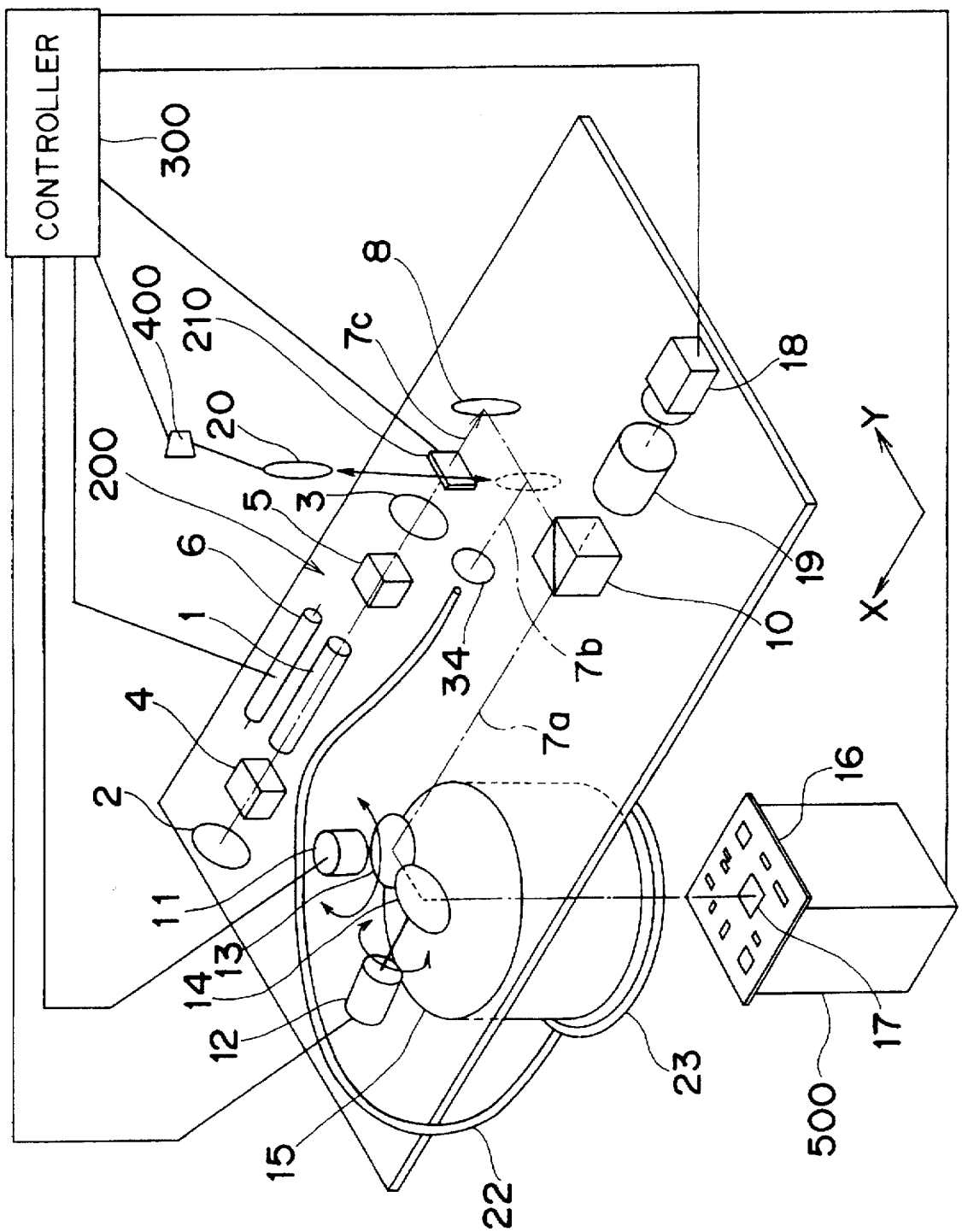
FIG. 1 is a perspective view of a laser processing apparatus according to a first embodiment of the present invention.

Before the description of the present invention proceeds, it is to be noted that like parts are designated by like reference numerals and throughout the accompanying drawings.

A first embodiment of the present invention will be discussed with reference to FIGS. 1 and 2.

Figure 2:
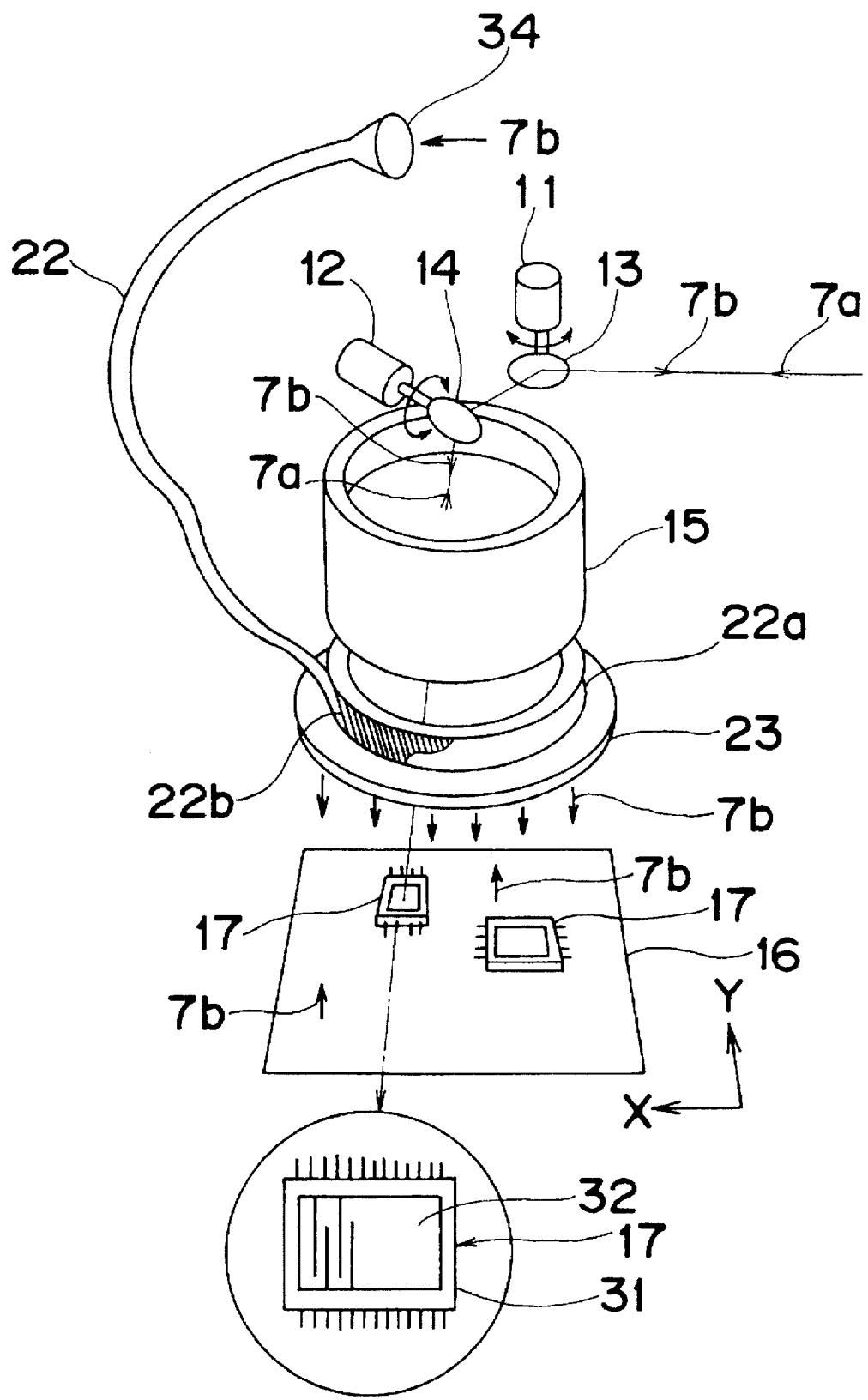
FIG. 2 is a perspective view indicating a common part in the laser processing apparatus according to the first embodiment and a laser processing apparatus according to a second embodiment of the present invention.

In FIGS. 1 and 2 showing a part of a laser processing apparatus according to the first embodiment, a laser output beam (processing laser beam) 7a emitted from a laser oscillator 200 is brought into an X scanner mirror 13. Since the X scanner mirror 13 is rotated back and forth in an X direction shown by an arrow by an X galvano scanner 11, the laser output beam 7a entering the X scanner mirror 13 scans in the X direction and is reflected 90° by the X galvano scanner 11 to enter a Y scanner mirror 14. The Y scanner mirror 14 is, similar to the X scanner mirror 13, rotated back and forth in a Y direction shown by an arrow by a Y galvano scanner 12, and therefore, the laser output beam 7a entering the Y scanner mirror 14 scans in the Y direction and is reflected 90° by the Y scanner mirror 14 to be brought into an fθ lens 15. The fθ lens 15 is so adapted as to form an image of a beam having a 532 nm frequency (using second higher harmonics of a YAG laser as will be described later) of the laser output beam 7a on a plane. Therefore, the output beam 7a scans in a state focused to a scanning position on a circuit board 16 where an electronic component 17 to be processed is present. Accordingly, only a desired position of the electronic component 17 is processed by the laser beam while the laser beam from the laser oscillator scans in the X and Y directions under the control by an oscillation controlling means such as a galvano shutter 210 for opening and closing the optical path of the beam.

The above laser processing is done, for instance, to trim a resistance R, a reactance L, and a capacitance C of the circuit board 16 after each electronic component is mounted to the circuit board 16. Specifically, after the electronic component 17 with a to-be-trimmed part 32 is mounted in a case 31, the part 32 is trimmed by laser processing to adjust the inductance. A 10 μm positional monitoring accuracy is required for the trimming, in addition to the capability of processing of a copper foil.

According to the first embodiment, as will be described later, an illumination laser beam of a single frequency not generating a chromatic aberration is employed to attain the above 10 μm accuracy. Moreover, a laser beam of a frequency of 532 nm in the range of 250–600 nm where the reflectivity to copper is small is utilized as a processing laser beam to make it possible to process the copper foil.

For the above purpose, it is necessary to remove the spatial coherency of the laser beam and prevent interference fringes from being generated in the illumination. A laser output beam (illumination laser beam) 7b of the same frequency as that of the laser output beam 7a is inserted into a bundle 22 of optical fibers 22b through a lens 34. The optical fibers 22b are gathered together into a fiber-optic loop 22a. End faces of the optical fibers 22b constituting the bundle 22 are aligned generally regularly on a lower surface of the fiber-optic loop 22a. The laser output beam 7b coming out from the end faces of the optical fibers 22b is further guided through a scattering plate 23 of ground glass or the like which irregularly refracts the passing beam, to thereby illuminate the circuit board 16. In the constitution as above, the laser output beam 7b is multi-reflected when passing through the bundle 22 to lose the spatial coherency and passes through the scattering plate 23 to thereby remove the spatial coherency. Because of no spatial coherency, even the laser output beam 7b is a linearly-polarized laser beam, the laser output beam 7b is utilizable as an illumination beam. A focusing optical system is constituted by the fθ lens 15 and the scattering plate 23.

The fθ lens 15 forms an image of a beam of the frequency of the laser output beam 7b on a plane. Therefore, the circuit board 16 is illuminated by the laser output beam 7b completely losing the spatial coherency.

FIG. 1 represents a state where the laser oscillator 200 of the apparatus according to the first embodiment for oscillating a laser beam of a 532 nm frequency and a monitoring camera 18 are added to the constitution of FIG. 2. In FIG. 1, the laser oscillator 200 includes an Nd:YAG rod 1, a rear mirror 2 disposed at the side of one end of the Nd:YAG rod 1 for totally reflecting a beam of a 1064 nm frequency, an output mirror 3 disposed at the side of the other end of the Nd:YAG rod 1 for totally reflecting the beam of a 1064 nm frequency while passing a beam of a 532 nm frequency, an acoustooptic Q-switching element 4 disposed between the Nd:YAG rod 1 and rear mirror 2 for oscillating a laser beam as approximately 1–5 kHz pulses, a frequency converting element 5 provided between the rod 1 and output mirror 3 and using a nonlinear optical crystal for converting the laser frequency of a 1064 nm frequency to a laser beam of second higher harmonics of a 532 nm frequency, and a pumping lamp 6.

When the pumping lamp 6 pumps the Nd:YAG rod 1 and drives the acoustooptic Q-switching element 4, a linearly-polarized laser output beam 7c consisting of trains of pulses, including about 1 W average power, of an approximately 1–5 kHz frequency and a 100–200 ns pulse width is output from the output mirror 3. The laser output beam 7c from the output mirror 3 through the shutter 210 is reflected 90° by a reflecting mirror 8 and enters a cubic polarizer 10. The cubic polarizer 10 totally reflects the linearly-polarized laser output beam 7c to the X scanner mirror 13. The thus-totally-reflected laser output beam 7c in FIG. 1 is the laser output beam (processing laser beam) 7a in FIG. 2.

Figure 5:
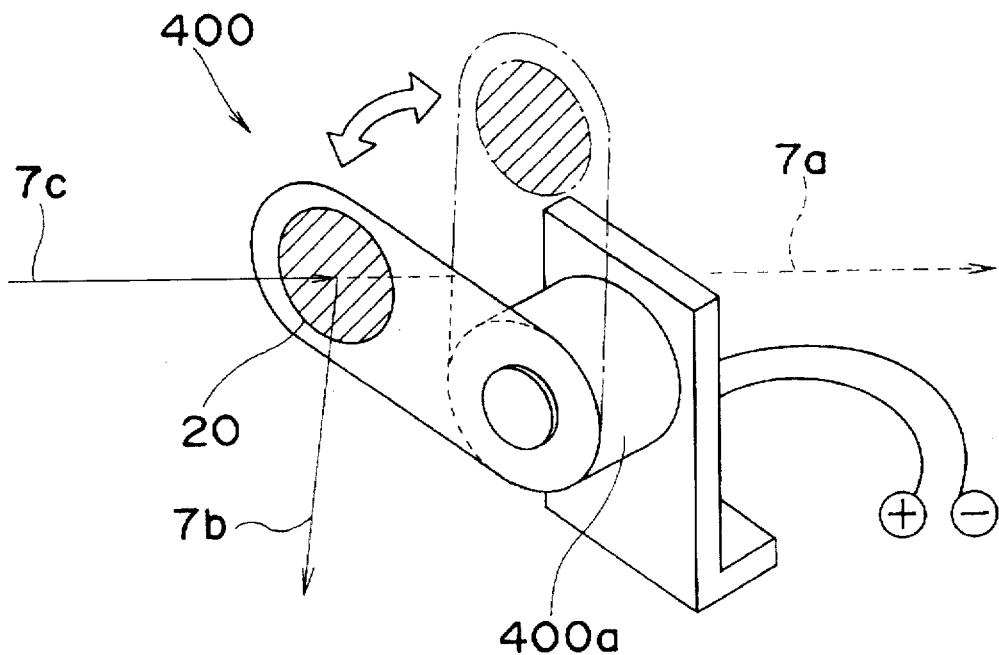
FIG. 5 is a perspective view showing a shutter for opening and closing an optical path of the laser beam in FIG. 1.

In order to use the laser output beam 7c from the output mirror 3 as the laser output beam (illumination laser beam) 7b of FIG. 2, a moving reflecting mirror 20 is set as a switching means for switching an optical path by driving of a driving device 400. The driving device 400 is shown in FIG. 5 and has a rotary solenoid 400a where the moving reflecting mirror 20 is set to be inclined by 45° with respect to the optical path of the laser output beam 7c. When the solenoid 400a is energized and is off, the moving reflecting mirror 20 is selectively moved to two positions, a first position shown by the solid line in FIG. 5 where the laser output beam 7c is reflected to the optical fiber bundle 22 through the lens 34 to use as the illumination laser beam 7b and a second position shown by the dotted line in FIG. 5 where the laser output beam 7c passes to the cubic polarizer 10 to use as the processing laser beam 7a. The moving reflecting mirror 20 periodically reciprocates between the first position where the mirror 20 is inserted between the reflecting mirror 8 and cubic polarizer 10 and the second position where the mirror 20 is moved away from between them, thereby reflecting the laser output beam 7c periodically. The reflected laser output beam 7c is brought into the optical fiber bundle 22 by the lens 34. The laser output beam 7c reflected by the mirror 20 in FIG. 1 becomes the laser output beam 7b shown in FIG. 2.

The laser output beam 7b entering the bundle 22 illuminates the circuit board 16 as discussed with reference to FIG. 2. The illumination laser beam (laser output beam) 7b reflected at the circuit board 16 forms an image through the fθ lens 15, Y scanner mirror 14, and X scanner mirror 13. Since the cubic polarizer 10 allows the illumination laser beam 7b without linear polarization properties to pass, the formed image is, through the cubic polarizer 10, monitored by a monitoring camera (photographing means) 18 via an image forming lens 19.

Figure 4:
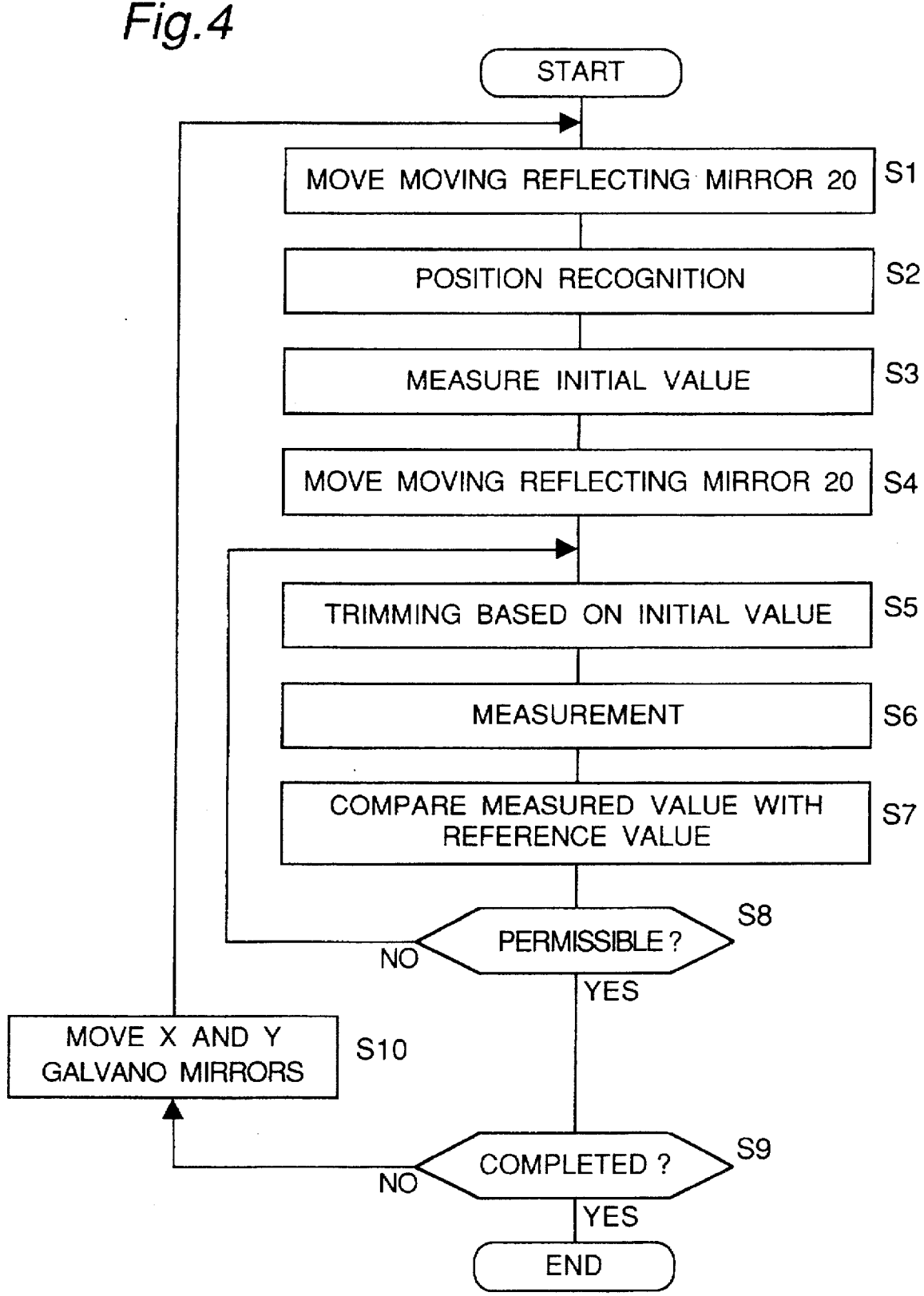
FIG. 4 is a flowchart showing a laser processing method according to the first embodiment of the present invention.

The laser processing method according to the first embodiment wherein the apparatus is used will be described with reference to FIG. 4.

First, at step S1, the moving reflecting mirror 20 is moved by the driving device 400 to be inserted into the optical path from the laser oscillator 200 to the X scanner mirror 13 as shown by the dotted line in FIG. 1. Then, the beam 7c from the oscillator 200 is reflected by the mirror 20 and enters the optical fiber bundle 22 to illuminate the circuit board 16 as the illumination laser beam 7b. The illumination laser beam reflected at the circuit board 16 passes the fθ lens 15, the Y scanner mirror 14, and the X scanner mirror 13, the cubic polarizer 10, and the image forming lens 19, and then enters the monitoring camera (photographing means) 18. Then, at step S2, the position monitoring of the circuit board 16 is carried out by the monitoring camera 18.

At step S3, a conductive body on the circuit board 16 to be processed by the laser beam to form a resistance R, a reactance L, or a capacitance C is measured by a measuring device 500 wherein the conductive body is energized to measure its initial value. Here, it is supposed that the resistance R is formed by trimming the conductive body. The measured initial value is compared with a reference value of the to-be-formed resistance R, and then a scanning position of the conductive body is determined based on the compared result.

At step S4, the moving reflecting mirror 20 is moved by the driving device 400 to move away from the optical path from the laser oscillator 200 to the X scanner mirror 13 as shown by the solid line in FIG. 1.

At step S5, the laser beam 7c from the oscillator 200 scans as the processing laser beam 7a the determined scanning position of the conductive body so as to process the conductive body to get the reference value of the resistance.

As step S6, the laser processing is stopped and the value of the resistance of the conductive body is measured by the measuring device 500. Then, the measured value is compared with the reference value of the resistance and then it is determined whether or not the measured value is within a permissible region of the reference value at step S8. If no at step S8, the trimming at step S5, measurement at step S6, and comparison at steps S7 and S8 are repeated. If yes at step S8, it is determined whether or not necessary conductive bodies of the circuit board 16 are processed at step S9. If no at step S9, the processing is terminated. If yes at step S9, the X and Y galvano scanners 13 and 14 are moved to a next conductive body of the circuit board 16 based on a predetermined data at step S10. Then, the next conductive body of the circuit body 16 is processed through the steps S1 through S8.

During the operation, the X galvano scanner 11, Y galvano scanner 12, X scanner mirror 13, and Y scanner mirror 14 may generate heat, and thus the heat causes a temperature drift which results in a change of the scanning position and causes errors. In order to solve this problem, the monitoring camera 18 monitors the position of the conductive body to be processed, based on which the scanning position of the conductive body is corrected by control of a controller 300. That is, the controller 300 is connected with the X galvano scanner 11, Y galvano scanner 12, the pumping lamp 6, the driving device 400, the shutter 210, the monitoring camera 18, and the measuring device 500 to control these devices or members based on pre-stored data such as reference values of resistance R, a reactance L, and a capacitance C of the circuit board 16 to be formed and the input data from the measuring device 500 and the monitoring camera 18, etc.

In the arrangement depicted hereinabove, since the laser output beams 7a, 7b have the same 532 nm frequency, it is enough for the fθ lens 15 to form an image of a beam of the single frequency. The number of lenses is reduced and a coating for prevention of reflection becomes simple and thus inexpensive. The visibility of the laser beams ensures safety. Generally-used optical parts can be used for the monitoring camera 18, etc. Accordingly, the present invention in the first embodiment is inexpensive with good sensitivity and improves and secures 10 μm of monitoring accuracy required at a peripheral part of a 130 mm×130 mm image because of the absence of chromatic aberration.

The laser output beam 7a for a processing laser beam has a 532 nm frequency which is within the range of 250–600 nm where the reflectivity to a conductive body of copper or the like is small, making it possible to process a copper foil, etc.

A second embodiment of the present invention will be described with reference to FIGS. 2 and 3.

FIG. 2, also showing a part of a laser processing apparatus according to the second embodiment, is the same as in the foregoing first embodiment, and therefore the description will be abbreviated here.

Figure 3:
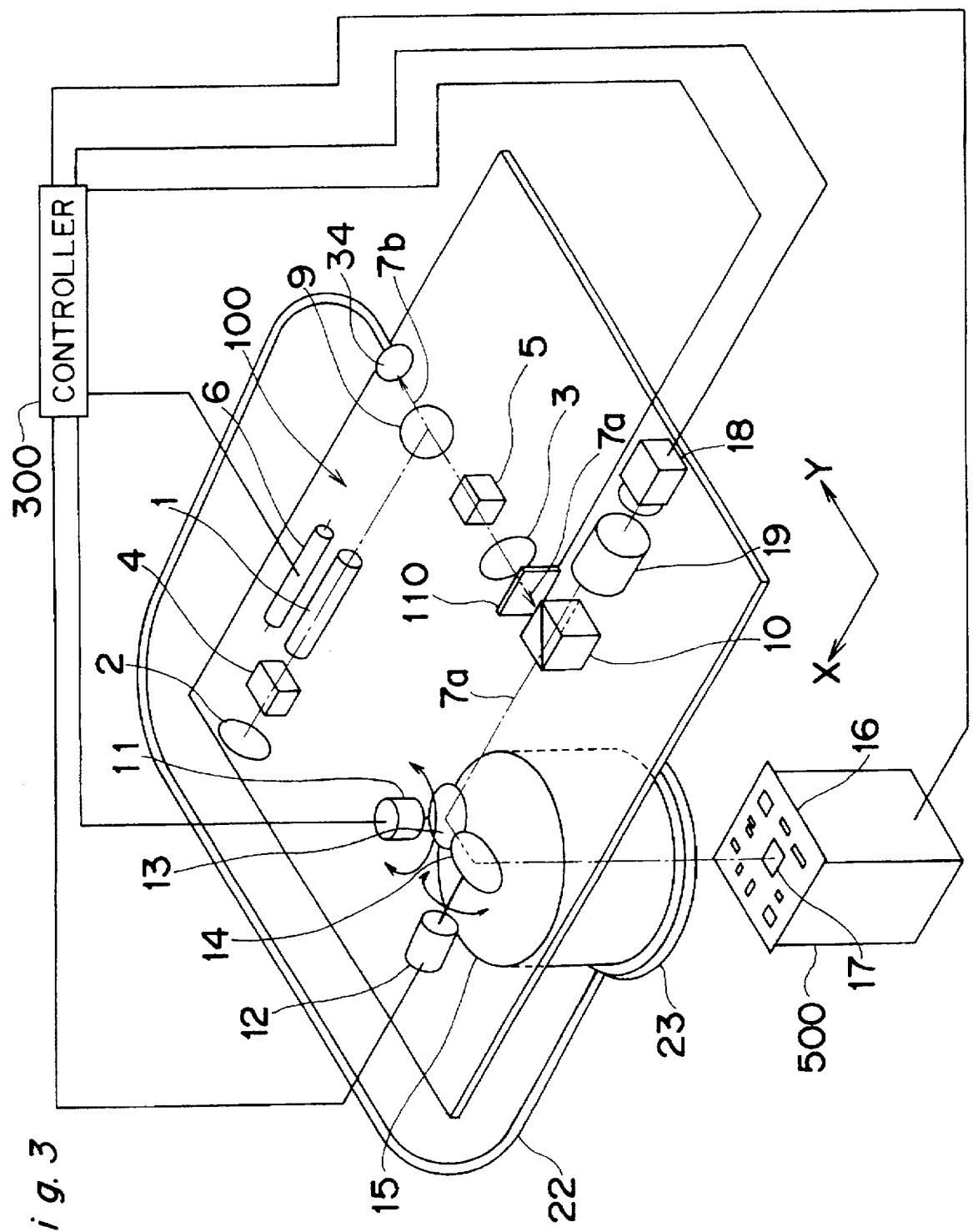
FIG. 3 is a perspective view of the laser processing apparatus according to the second embodiment of the present invention.

As indicated in FIG. 3, the laser oscillator of the apparatus according to the second embodiment includes an Nd:YAG rod 1, a rear mirror 2 disposed at the side of one end of the Nd:YAG rod 1 and totally reflecting a beam of a 1064 nm frequency, a mirror 9 which is a dichroic mirror set at the side of the other end of the Nd:YAG rod 1 and totally reflecting the beam of a 1064 nm frequency while allowing passage of a beam of a 532 nm frequency, an output mirror 3 arranged in a reflecting direction of the mirror 9 and totally reflecting the beam of a 1064 nm frequency while passing the beam of a 532 nm frequency, an acoustooptic Q-switching element 4 arranged between the rod 1 and mirror 2 to oscillate a laser beam in the form of approximately 1–5 kHz pulses, a frequency converting element 5 using a nonlinear optical crystal and disposed between the mirrors 9 and 3 to convert the laser frequency of a 1064 nm frequency to a laser beam of second higher harmonics of a 532 nm frequency which is visible, and a pumping lamp 6.

When the pumping lamp 6 pumps the Nd:YAG rod 1 and drives the acoustooptic Q-switching element 4, the linearly-polarized laser output beam 7a and the laser output beam 7b each consisting of trains of pulses, including approximately 1 W average power, of an approximately 1–5 kHz pulse frequency and a 100–200 ns pulse width are simultaneously output from the output mirror 3 and mirror 9. The laser output beam 7a from the output mirror 3 through a galvano shutter 110 serving as an oscillation controlling means is brought into a cubic polarizer 10 which in turn totally reflects the coming linearly-polarized laser output beam 7a to the X scanner mirror 13. The totally-reflected laser output beam 7a in FIG. 3 is the laser output beam 7a in FIG. 2. The controller 300 is connected with the X galvano scanner 11, Y galvano scanner 12, the pumping lamp 6, the shutter 110, the monitoring camera 18, and the measuring device 500 to control these devices or members based on pre-stored data such as reference values of resistance R, a reactance L, and a capacitance C of the circuit board 16 to be formed and the input data from the measuring device 500 and the monitoring camera 18, etc. The remaining description related to FIG. 2 is the same as in the first embodiment, and will be abbreviated here.

The laser output beam 7b from the mirror 9 in FIG. 3 is the laser output beam 7b of FIG. 2, entering the optical fiber bundle 22 after being focused by the lens 34 to use the beam 7b as the illumination laser beam.

Since processing and monitoring of the position can be carried out concurrently in the second embodiment, while decreasing the tact time as compared with the first embodiment. The same effect as in the first embodiment is attained except for this point.

The apparatus and method for laser processing of the invention are not restricted to the embodiments described hereinabove, and various modifications may be conceivable so long as the laser beams of the same frequency are used as a processing laser beam and as an illumination laser beam and the laser beam of a 250–600 nm frequency is used to process a copper foil, etc.

Figure 7:
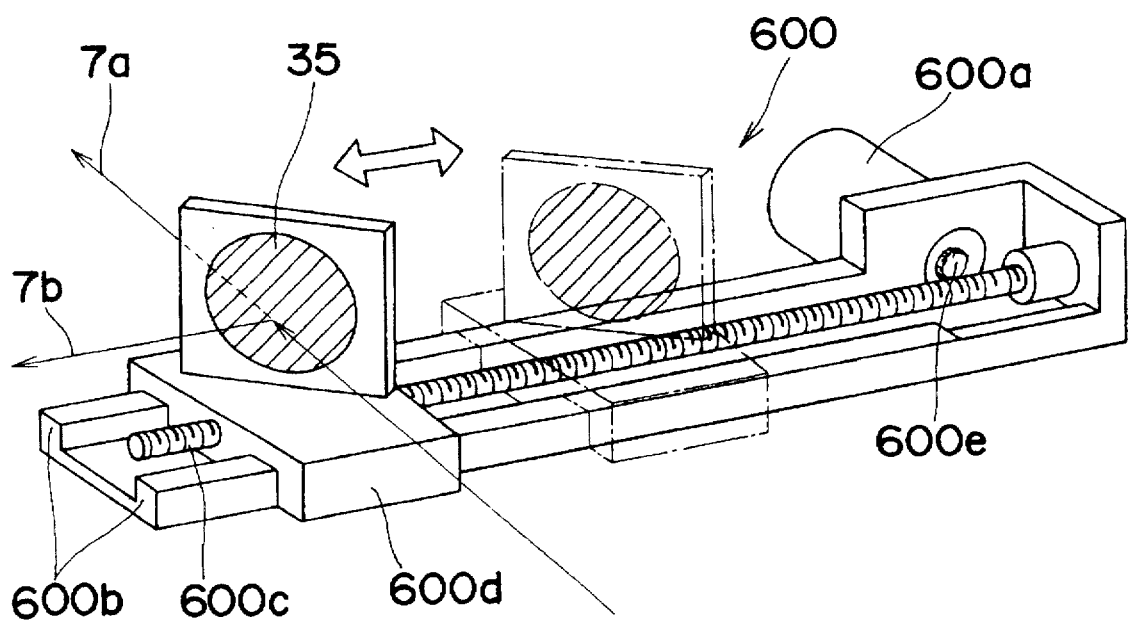
FIG. 7 is a perspective view showing a driving device in FIG. 6.
Figure 6:
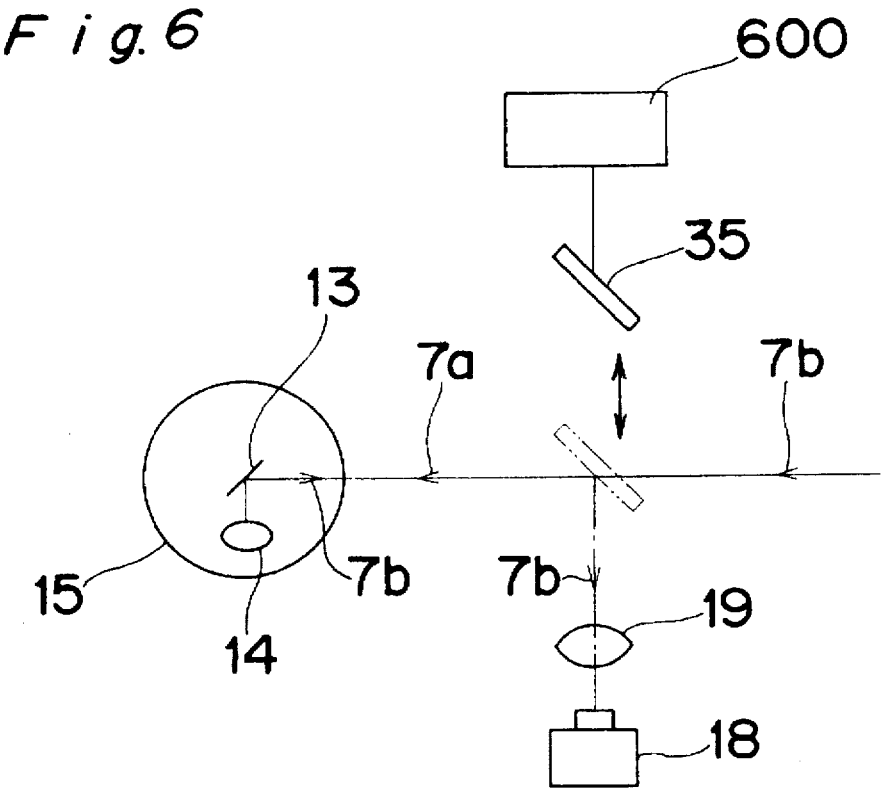
FIG. 6 is a schematic diagram of an optical path in a different embodiment of the present invention.
Figure 8:
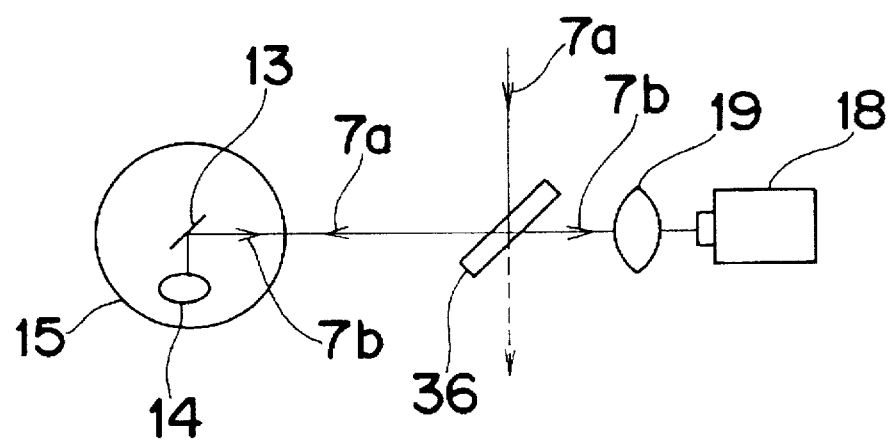
FIG. 8 is a schematic diagram of an optical path in a yet different embodiment of the present invention.
Figure 9:
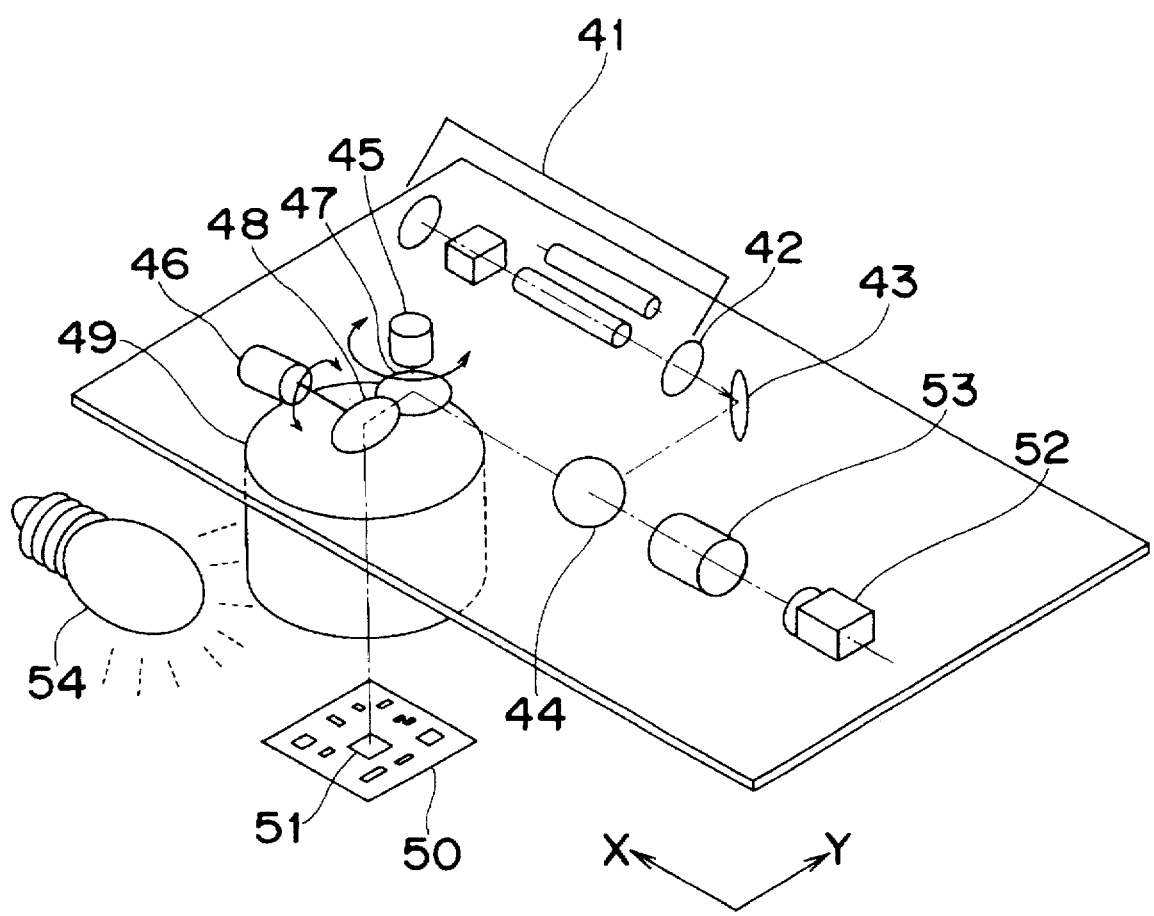
FIG. 9 is a perspective view of a conventional laser processing apparatus.

For example, the laser oscillator is not limited to one using an Nd:YAG crystal as in the first and second embodiments, and two laser beam sources may be used instead of only one laser beam source. Instead of the cubic polarizer 10, a moving total reflection mirror 35 as shown in FIGS. 6 and 7 or a half mirror 36 as in FIG. 8 may be utilized as an optical path selecting means to separate the illuminating beam monitored by the monitoring camera 18. In FIGS. 6 and 7, the moving total reflection mirror 35 is driven by a driving device 600 under the control of the controller 300 connected with the driving device 600. The driving device 600 has a motor 600a for rotating a gear 600e engaging with a screw shaft 600c. When the gear 600e is rotated, the shaft 600c is rotated to move back and forth a moving body 600d while guiding with guide rails 600b. The mirror 35 is set on the moving body 600d so as to be inclined by 45° with respect to the optical path of the laser output beam 7a to selectively move the mirror 35 to a first position for reflecting the beam 7b from the circuit board 16 to the monitoring camera 18 which is shown by the solid line in FIG. 5 and a second position for moving away from the optical path to allow passage of the laser output beam 7a to the conductive body which is shown by the dotted line in FIG. 7.

According to the apparatus and the method for laser processing of the present invention, an illumination laser beam of a single frequency is used for illumination, so that no chromatic aberration can be generated in an image monitored by a photographing means for positional monitoring, enhancing a positional monitoring accuracy. For example, 10 μm of monitoring accuracy impossible to attain in the prior art can be ensured even at a peripheral part of a 130 mm×130 mm image. Since using fθ lens of the prior art is necessary to match an illuminating beam of the bandwidth of several tens of nm frequency and form an image of a beam of two frequencies, the number of lenses of the fθ lens is increased and the antireflection coating is complicated to design and expensive. In contrast, the apparatus and method of the first and ninth features of the present invention uses laser beams of the same frequency as a processing laser beam and as an illumination laser beam, allowing the focusing optical system to function only to form an image of a beam of the one frequency. Accordingly, the apparatus and method can be simplified and made compact in structure and reduced in cost.

When the apparatus for laser processing according to the present invention uses laser beams from the same laser beam source as a processing laser beam and as an illumination laser beam, the apparatus can become simple.

When the apparatus for laser processing according to the invention is provided with the half mirror or polarizer at an intersection between an optical path of an illumination laser beam passing the focusing optical system after being reflected at a to-be-processed article to the photographing means for positional monitoring and an optical path of a processing laser beam to the focusing optical system, the photographing means can be driven to monitor a processing state while processing by the processing laser beam is carried out.

When the apparatus for laser processing according to the invention is provided with the selecting means for selectively shutting one of an optical path of an illumination laser beam passing the focusing optical system after being reflected at a to-be-processed article to the photographing means and an optical path of a processing laser beam to the focusing optical system, and maintaining the other optical path, the photographing means can be driven with the utilization of the time when processing by the processing laser beam is stopped, to monitor a processing state.

When in the apparatus for laser processing according to the invention, the illuminating optical system has the optical fiber and the scattering plate for scattering a passing beam, an illumination laser beam can lose its spatial coherent characteristic when passing through the optical fiber and can be further scattered by the scattering plate to be an illumination laser beam without spatial coherency.

When in the apparatus for laser processing according to the invention, the laser beam source has a nonlinear optical crystal as the frequency converting element within the YAG oscillator to output a laser beam of second higher harmonics, a processing laser beam of a 532 nm frequency which shows a small reflectivity to copper and fit for processing of a copper foil can be obtained.

When the apparatus for laser processing according to the invention is provided with the optical path switching means for switching an optical path of a laser beam of second higher harmonics to that for an illumination laser beam or for a processing laser beam, laser beams of the same single frequency can be used as the processing laser beam and the illumination laser beam.

When in the apparatus for laser processing according to the invention, the laser beam source has a nonlinear optical crystal as the frequency converting element within the YAG oscillator to output laser beams of second higher harmonics in both directions and one of the laser beams is used as a processing laser beam, while the other is used as an illumination laser beam, a mechanism using the laser beams of the same single frequency both for a processing laser beam and for an illumination laser beam can be simplified.

In the method for laser processing according to the present invention, for eliminating such an inconvenience that a conductive body, e.g., copper, silver or the like has been regarded difficult to process by a laser beam, particularly copper has been generally difficult to process due to its large reflectivity to a laser beam, a laser beam of 250–600 nm in frequency can be used because the reflectivity of the conductive body such as copper is small to the beam in the above range of frequency, thus enabling trimming of a copper foil or the like.

According to the method for laser processing according to the invention, what was impossible to trim in the prior art processing method can be trimmed, making it possible to adjust an inductance of a to-be-processed article formed of a conductive pattern.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A laser processing apparatus comprising:

a laser beam source;

a focusing optical system for focusing a laser beam as a processing laser beam to a surface of a to-be-processed article;

an illuminating optical system using a laser beam of the same frequency as that of the processing laser beam as an illumination laser beam for illuminating the surface of the to-be-processed article;

a photographing means for detecting the illumination laser beam reflected from the to-be-processed article through the focusing optical system to thereby monitor a processing position by the laser beam; and a selecting means for selectively shutting one of an optical path of the illumination laser beam passing through the focusing optical system after being reflected at the to-be-processed article to the photographing means for positional monitoring and an optical path of the processing laser beam to the focusing optical system, while maintaining the other optical path.

2. A laser processing apparatus comprising:

a laser beam source;

a focusing optical system for focusing a laser beam as a processing laser beam to a surface of a to-be-processed article;

an illuminating optical system using a laser beam of the same frequency as that of the processing laser beam as an illumination laser beam for illuminating the surface of the to-be-processed article;

a photographing means for detecting the illumination laser beam reflected from the to-be-processed article through the focusing optical system to thereby monitor a processing position by the laser beam;

a selecting means for selectively shutting one of an optical path of the illumination laser beam passing through the focusing optical system after being reflected at the to-be-processed article to the photographing means for positional monitoring and an optical path of the processing laser beam to the focusing optical system, while maintaining the other optical path; and wherein the processing laser beam and the illumination laser beam are output from the laser beam source.

3. A laser processing apparatus comprising:

a laser beam source;

a focusing optical system for focusing a laser beam as a processing laser beam to a surface of a to-be-processed article;

an illuminating optical system using a laser beam of the same frequency as that of the processing laser beam as an illumination laser beam for illuminating the surface of the to-be-processed article;

a photographing means for detecting the illumination laser beam reflected from the to-be-processed article through the focusing optical system to thereby monitor a processing position by the laser beam;

wherein the laser beam source has a nonlinear optical crystal as a frequency converting element within a YAG laser oscillator to output a laser beam of second higher harmonics; and wherein a switching means is provided for switching an optical path of the laser beam of second higher harmonics to that for the illumination laser beam or processing laser beam.

4. The laser processing apparatus according to claim 3, wherein the processing laser beam and the illumination laser beam are output from the laser beam source.

* * * * *